D. R. SHIRAS.
Cooling Apparatus for Stand Pipes of Gas-Retorts.
No. 8,436. Reissued Sept. 24, 1878.
Fig. 1.
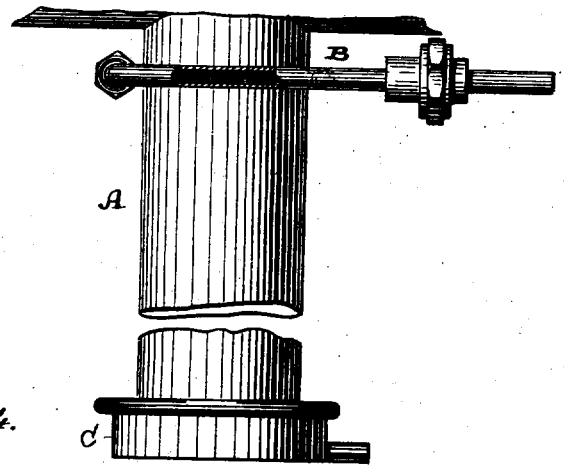
Fig. 4.
Fig. 2.
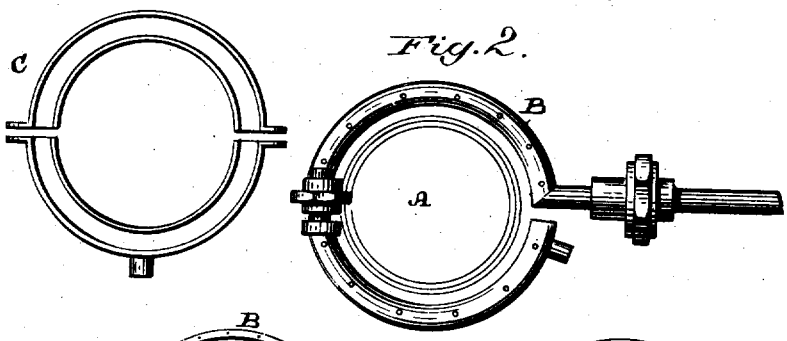
Fig. 3.
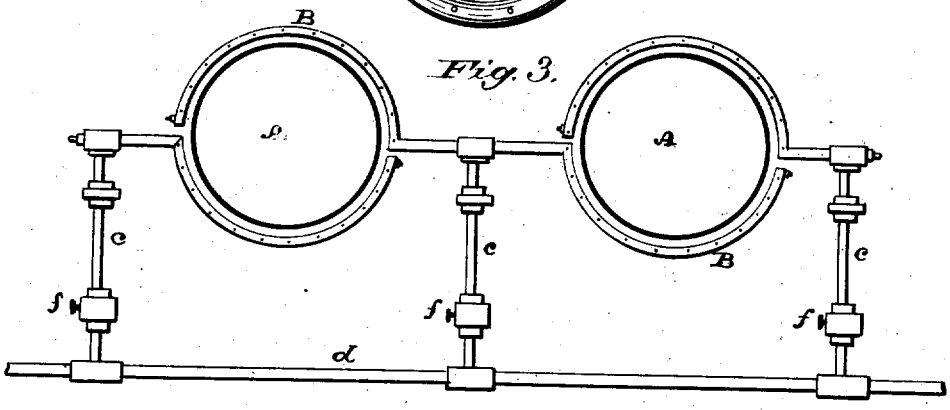
Attest:
D. G. Stuart
G. H. Morgan
Inventor:
David R. Shiras
(by) A. M. Wallum
Atty
N. PETERS, PHOTO-LITHOGRAPHER, WASHINGTON, D. C.

UNITED STATES PATENT OFFICE.

DAVID R. SHIRAS, OF SHARON, PENNSYLVANIA.

IMPROVEMENT IN COOLING APPARATUS FOR STAND-PIPES OF GAS-RETORTS.

Specification forming part of Letters Patent No. 192,944, dated July 10, 1877; Reissue No. 8,436, dated September 24, 1878; application filed December 10, 1877.

*To all whom it may concern:*

Be it known that I, DAVID R. SHIRAS, of Sharon, in the county of Mercer and State of Pennsylvania, have invented certain new and useful Improvements in Cooling Apparatus for Stand-Pipes of Gas-Retorts; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The object of my invention is to prevent the stand-pipes of gas-retorts from becoming heated to such a degree as to bake or solidify the products of distillation passing through them, thereby preventing any accumulation of carbon or tarry matter in the pipes, and allowing of the heating of the retorts to the maximum degree of temperature without danger of clogging or stopping up the stand-pipes. As a result, the quantity or volume of gas is increased, its quality improved, and a great saving in time and material is effected.

The invention consists in a new and improved apparatus for keeping the stand-pipes cool, said apparatus consisting of a perforated pipe or water-conduit made to encircle the stand-pipe and project jets or streams of cold water on its outer surface, the water then flowing downward in contact with the pipe.

It also consists in providing a suitable device for receiving the water at the lower end of the stand-pipe and for conducting it away therefrom, said receiving device being made in two parts, united together after being placed around the stand-pipe; and, further, the invention consists in the combination of the devices employed, all as hereinafter more fully set forth.

In the accompanying drawings, Figure 1 is a side elevation of my improved apparatus. Fig. 2 is a plan view of the same. Fig. 3 is a plan view of a series of stand-pipes, showing the application of my improvement. Fig. 4 is a detail view of a modified form of the device for conducting away the water used in cooling the stand-pipes.

Referring to the parts by letters, A represents an ordinary stand-pipe, which conducts the gaseous products of distillation from the mouth of the retort to the hydraulic main.

B is a pipe or water-conduit, which is made so as to encircle the stand-pipe at a point near its upper end, and which is supported in said position in any suitable or convenient manner. It is also coupled or connected with a water-supply pipe, and so constructed with a series of perforations as to discharge or project jets or streams of water around and against the outer periphery of the stand-pipe.

Fig. 3 of the drawings shows a convenient method of arranging the water-supply where a series of stand-pipes are used, *d* representing the main, *c* the branch pipes, and B the water-discharging devices. *f* represents stop-cocks in the pipes *c* for controlling the flow of the water.

C is a conduit or trough, which encircles the stand-pipe at its lower end and receives the water discharged from the conduit B after it has passed over the outer surface of the stand-pipes to cool the same. A pipe is connected with this trough or conduit C for conducting the water away.

When my apparatus is applied to works already completed the parts which encircle the stand-pipe are preferably made in halves or sections, as shown by Fig. 4 of the drawings, for convenience in placing them in position; but, if desirable or convenient, they may be formed or cast with and as a part of the stand-pipe.

I am aware that an annular open-mouth trough or receptacle for water has heretofore been arranged near the top of the stand-pipe of a gas-retort, said trough being provided with openings in its bottom, by means of which the water in the trough flows downward around the outside of the stand-pipe to cool it.

I am also aware that a trough has been applied to the lower end of the stand-pipe to receive the water. In my invention I employ, instead of said water-trough at the top, a curved water-pipe encircling the upper end of the stand-pipe, provided with perforations in its lower face, but closed elsewhere, whereby the water in the perforated pipe is projected against the outside of the stand-pipe in jets, and more water is brought against the outside of the stand-pipe than when the open trough above described is employed, a portion of the water being liable to escape from the open top of the trough in the latter case; and hence the stand-pipe is kept cooler in my invention than when the open-top trough is employed.

Having thus described my invention, what I claim as new, and desire to secure by Letters Patent, is—

1. In combination with the stand-pipe of a gas-retort, the curved perforated pipe B, constructed, as described, with a series of perforations, by means of which jets of water are projected against the outside of the stand-pipe and caused to flow downward around and in contact therewith, substantially as and for the purpose specified.

2. In combination with the stand-pipe of a gas-retort, a trough or conduit, C, constructed, as described, of two parts united together and attached to the stand-pipe, for the purpose of arresting and carrying off the water, substantially as specified.

3. In combination with the stand-pipe of a gas-retort, a perforated water-discharging device, B, and water-receiver C, constructed, as described, of two parts united together and attached to the stand-pipe, substantially as and for the purpose specified.

In testimony that I claim the foregoing I have hereunto set my hand this 21st day of November, 1877.

DAVID R. SHIRAS.

Witnesses:
JOSEPH KING,
J. T. GIEBNER.